United States Patent
Zhao et al.

(10) Patent No.: US 10,932,299 B2
(45) Date of Patent: Feb. 23, 2021

(54) RANDOM ACCESS PREAMBLE SEQUENCE GENERATION METHOD AND USER EQUIPMENT

(71) Applicant: Huawei Technologies Co., Ltd., Shenzhen (CN)

(72) Inventors: Yue Zhao, Beijing (CN); Li Chai, Shenzhen (CN); Zhiheng Guo, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/364,556

(22) Filed: Mar. 26, 2019

(65) Prior Publication Data

US 2019/0223226 A1    Jul. 18, 2019

Related U.S. Application Data

(63) Continuation of application No. PCT/CN2016/100957, filed on Sep. 29, 2016.

(51) Int. Cl.
*H04W 74/08* (2009.01)
*H04W 74/00* (2009.01)
(Continued)

(52) U.S. Cl.
CPC ..... *H04W 74/0833* (2013.01); *H04J 13/0062* (2013.01); *H04J 13/22* (2013.01);
(Continued)

(58) Field of Classification Search
CPC ............. H04W 74/0833; H04W 74/08; H04W 74/008; H04W 74/006; H04J 13/0062; H04J 13/22; H04J 13/10; H04L 27/3444
See application file for complete search history.

(56) References Cited

U.S. PATENT DOCUMENTS

| 8,477,698 B2 * | 7/2013 | Lee ..................... H04J 13/0062 370/329 |
| 2003/0103445 A1 * | 6/2003 | Steer ...................... H04L 5/143 370/208 |

(Continued)

FOREIGN PATENT DOCUMENTS

| CN | 103634926 A | 3/2014 |
| CN | 103763784 A | 4/2014 |

(Continued)

OTHER PUBLICATIONS

3GPP TS 36.211 V13.2.0 (Jun. 2016); 3rd Generation Partnership Project; Technical Specification Group Radio Access Network; Evolved Universal Terrestrial Radio Access (E-UTRA); Physical channels and modulation (Release 13), 168 pages (2016).

(Continued)

*Primary Examiner* — Hassan Kizou
*Assistant Examiner* — Abdullahi Ahmed
(74) *Attorney, Agent, or Firm* — Leydig, Voit & Mayer, Ltd.

(57) ABSTRACT

A random access preamble sequence generation method and user equipment are provided. The method includes the following: when receiving first notification signaling sent by a base station, determining, by UE, to calculate a cyclic shift value by using a first solution; obtaining a first logical root sequence number, and determining a root sequence based on the first logical root sequence number; and generating a random access preamble sequence based on the root sequence and the cyclic shift value, where the first solution is a solution of calculating the cyclic shift value when a Doppler shift of the UE is less than a first preset value and greater than a second preset value, the first preset value is less than twice of a physical random access channel (Continued)

User equipment                Base station (PRACH) subcarrier spacing, the second preset value is greater than the PRACH subcarrier spacing.

19 Claims, 4 Drawing Sheets

(51) Int. Cl.
  *H04L 27/34* (2006.01)
  *H04J 13/00* (2011.01)
  *H04J 13/22* (2011.01)
(52) U.S. Cl.
  CPC ....... *H04L 27/3444* (2013.01); *H04W 74/006* (2013.01); *H04W 74/008* (2013.01); *H04W 74/08* (2013.01)

(56) References Cited

U.S. PATENT DOCUMENTS

| | | | | |
|---|---|---|---|---|
| 2005/0002324 | A1* | 1/2005 | Sutivong | H04L 1/20 370/208 |
| 2009/0046629 | A1* | 2/2009 | Jiang | H04J 13/0062 370/328 |
| 2009/0073944 | A1* | 3/2009 | Jiang | H04J 11/00 370/338 |
| 2013/0044667 | A1* | 2/2013 | Han | H04L 1/0025 370/311 |
| 2015/0163829 | A1 | 6/2015 | Li et al. | |
| 2017/0086228 | A1 | 3/2017 | Wu et al. | |
| 2018/0138962 | A1* | 5/2018 | Islam | H04L 5/0032 |
| 2018/0242370 | A1 | 8/2018 | Zhao et al. | |
| 2020/0145269 | A1* | 5/2020 | Zhang | H04L 27/2613 |

FOREIGN PATENT DOCUMENTS

| | | |
|---|---|---|
| KR | 20100095462 A | 8/2010 |
| WO | 2013069850 A1 | 5/2013 |
| WO | 2015184977 A1 | 12/2015 |
| WO | 2015191347 A1 | 12/2015 |

OTHER PUBLICATIONS

Huawei, "Way forward on PRACH performance enhancement", 3GPP TSG-RAN WG4 Meeting #78, R4-160781, St. Julian's, Malta, Feb. 15-19, 2016, 4 pages.
3GPP TR 36.878 V13.0.0 (Jan. 2016); 3rd Generation Partnership Project; Technical Specification Group Radio Access Network; Study on performance enhancements for high speed scenario in LTE (Release 13), 92 pages (2016).
Huawei, "PRACH enhancement in high speed scenario", 3GPP TSG RAN WG1 Meeting #86, R1-168354, Gothenburg, Sweden, Aug. 22-26, 2016, 10 pages.
RAN4, "Draft LS on a New PRACH Cyclic Shift Restriction Set", 3GPP TSG-RAN WG4 Meeting #78, R4-161254, St. Julian's, Malta, Feb. 15-19, 2016, 2 pages.
Ericsson, "Physical layer limits for Doppler frequency management", 3GPP TSG-RAN WG4 Meeting #75, R4-152961, Fukuoka, Japan, May 25-29, 2015, 2 pages.
Qualcomm Incororated, "PRACH enhancements", 3GPP TSG RAN WG1 #86, R1-166315, Aug. 22-26, 2016, Gothenburg, Sweden, 1 page.
Huawei, HiSilicon, "BS performance evaluation under new scenarios", 3GPP TSG-RAN WG4 Meeting #75, R4-152604, Fukuoka, Japan, May 25-29, 2015, 4 pages.
Huawei, HiSilicon, "PRACH enhancement in high speed scenario", 3GPP TSG RAN WG1 Meeting #84bis, R1-162619, Busan, Korea, Apr. 11-15, 2016, 7 pages.
Alcatel Lucent, "A New Cyclic Shift Restriction Set for Very High Speed Cells", 3GPP TSG-RAN WG4 Meeting #76, R4-15xxxx, Beijing, China, Aug. 24-28, 2015, 7 pages.
"Restricted sets of cyclic shifts for PRACH in high speed scenario," 3GPP TSG RAN WG1 Meeting #86bis, Lisbon, Portugal, R1-1609349, Total 13 pages, 3rd Generation Partnership Project, Valbonne, France (Oct. 10-14, 2016).

\* cited by examiner

User equipment    Base station

RANDOM ACCESS PREAMBLE SEQUENCE GENERATION METHOD AND USER EQUIPMENT

CROSS-REFERENCE TO RELATED APPLICATIONS

This application is a continuation of International Application No. PCT/CN2016/100957, filed on Sep. 29, 2016, the disclosure of which is hereby incorporated by reference in its entirety.

TECHNICAL FIELD

Embodiments of the present invention relate to the field of communications technologies, and in particular, to a random access preamble sequence generation method and user equipment.

BACKGROUND

Random access is an access manner in which user equipment (UE) communicates with a base station. For the UE, a primary task of random access is to generate random access preamble sequences. In a Long Term Evolution (LTE) system, a random access process has two modes: contention-based random access and non-contention-based random access. The random access preamble sequences are specifically generated by receiving notification signaling that is sent by a base station and that instructs to generate the random access preamble sequences. The notification signaling may carry a parameter such as a logical root sequence number, a zero correlation zone length index (Zero Correlation Zone Config), or a quantity of contention-based random access preamble sequences. The random access preamble sequences are generated by using the parameter of the notification signaling and an existing random access preamble sequence generation solution.

However, the existing random access preamble sequence generation solution is a solution specific for a state in which the UE is in a low-speed or static state, and for a state in which a Doppler shift of the UE is less than a physical random access channel (PRACH) subcarrier spacing. When a current LTE system works on a higher frequency, or the UE moves at a higher speed, the Doppler shift of the UE is greater than the PRACH subcarrier spacing. If the existing random access preamble sequence generation solution is still used, mutual interference between UEs is caused, and fuzzy detection occurs when the base station detects random access sequences.

SUMMARY

Embodiments of the present invention provide a random access preamble sequence generation method and user equipment, so that when a Doppler shift of UE is greater than a PRACH subcarrier spacing and less than twice of the PRACH subcarrier spacing, mutual interference between UEs can be eliminated, and a problem that fuzzy detection occurs when a base station detects random access sequences can be resolved.

According to a first aspect, an embodiment of the present invention provides a random access preamble sequence generation method, including:

determining, by UE, to calculate a cyclic shift value by using a first solution, when the UE receives first notification signaling sent by a base station;

obtaining, by the UE, a first logical root sequence number, and determining a root sequence based on the first logical root sequence number; and generating, by the UE, a random access preamble sequence based on the root sequence and the cyclic shift value, where the first solution is a solution of calculating the cyclic shift value when a Doppler shift of the UE is less than a first preset value and greater than a second preset value, the first preset value is less than twice of a physical random access channel PRACH subcarrier spacing, the second preset value is greater than the PRACH subcarrier spacing, and the first preset value is greater than the second preset value.

In the first aspect of the embodiment of the present invention, when the first notification signaling is received, the cyclic shift value can be calculated by using a calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

With reference to the first aspect, in a first implementation of the first aspect, the first notification signaling carries a target Ncs index, and the determining, by UE, to calculate a cyclic shift value by using a first solution, when the UE receives first notification signaling sent by a base station includes:

when the UE receives the first notification signaling sent by the base station, obtaining, by the UE based on a preset mapping table between an Ncs index and an Ncs value, a target Ncs value corresponding to the target Ncs index; and calculating, by the UE based on the target Ncs value, the cyclic shift value by using the first solution.

In this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes. Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

For example, if the quantity of Ncs indexes in the mapping table between an Ncs index and an Ncs value is 13, for example, if the Ncs indexes are integers 0 to 12, Ncs values corresponding to the Ncs indexes are respectively 15, 18, 22, 26, 32, 38, 46, 55, 68, 82, 100, 128, and 137.

With reference to the first aspect and the first implementation of the first aspect, in a second implementation of the first aspect, the first notification signaling further carries a high-speed flag bit, and the high-speed flag bit is used to indicate a solution of calculating the cyclic shift value; and the determining, by UE, to calculate a cyclic shift value by using a first solution, when the UE receives first notification signaling sent by a base station includes: when the UE receives the first notification signaling sent by the base station, if the high-speed flag bit is a first preset identifier, determining, by the UE, to calculate the cyclic shift value by using the first solution.

Optionally, when the UE receives the first notification signaling sent by the base station, if the high-speed flag bit is a second preset identifier, the UE determines to calculate the cyclic shift value by using a second solution; or when the UE receives the first notification signaling sent by the base station, if the high-speed flag bit is a third preset identifier, the UE determines to calculate the cyclic shift value by using a third solution, where the second solution is a solution of calculating the cyclic shift value when the Doppler shift of the UE is greater than a third preset value and less than the second preset value; the third solution is a solution of calculating the cyclic shift value when the Doppler shift of the UE is less than the third preset value; and the third preset value is less than the second preset value.

With reference to the first aspect and the first implementation of the first aspect, in a third implementation of the first aspect, before the determining, by user equipment UE, to calculate a cyclic shift value by using a first solution, when the UE receives first notification signaling sent by a base station, the method further includes:

receiving, by the UE, notification signaling sent by the base station, where the notification signaling includes the first notification signaling and/or second notification signaling, and the second notification signaling is used to instruct the UE to calculate the cyclic shift value by using a second solution or a third solution, where the second solution is a solution of calculating the cyclic shift value when the Doppler shift of the UE is greater than a third preset value and less than the second preset value; the third solution is a solution of calculating the cyclic shift value when the Doppler shift of the UE is less than the third preset value; and the third preset value is less than the second preset value.

With reference to the third implementation of the first aspect, in a fourth implementation of the first aspect, the determining, by user equipment UE, to calculate a cyclic shift value by using a first solution, when the UE receives first notification signaling sent by a base station includes:

when the UE receives only the first notification signaling sent by the base station, determining, by the UE, to calculate the cyclic shift value by using the first solution; or when the UE receives the first notification signaling and the second notification signaling that are sent by the base station, determining, by the UE, to calculate the cyclic shift value by using the first solution.

With reference to the third implementation of the first aspect, in a fifth implementation of the first aspect, if the UE does not receive the first notification signaling sent by the base station, but receives the second notification signaling sent by the base station, the UE determines to calculate the cyclic shift value by using the second solution or the third solution.

With reference to the third implementation of the first aspect, in a sixth implementation of the first aspect, the first notification signaling further carries a high-speed flag bit; and the determining, by UE, to calculate a cyclic shift value by using a first solution, when the UE receives first notification signaling sent by a base station includes:

when the UE receives the first notification signaling sent by the base station, if the high-speed flag bit is a first preset identifier, determining, by the UE, to calculate the cyclic shift value by using the first solution.

Optionally, when the UE receives the first notification signaling and the second notification signaling that are sent by the base station, if the high-speed flag bit is a second preset identifier, the UE determines, according to the second notification signaling, to calculate the cyclic shift value by using the second solution or the third solution.

With reference to the first aspect, the first implementation of the first aspect, the second implementation of the first aspect, the third implementation of the first aspect, the fourth implementation of the first aspect, the fifth implementation of the first aspect, or the sixth implementation of the first aspect, in a seventh implementation of the first aspect, the obtaining, by the UE, a first logical root sequence number may include the following two feasible solutions:

In a solution, if the first notification signaling carries a logical root sequence number, the UE determines the logical root sequence number carried in the first notification signaling as the first logical root sequence number. In this case, the base station may configure different logical root sequence numbers in the first notification signaling and the second notification signaling, so that a probability that UE that performs access by using the first notification signaling collides with UE that performs access by using the second notification signaling can be reduced, a random access time can be shortened, and random access efficiency can be improved.

In another solution, if the second notification signaling carries a logical root sequence number, and the first notification signaling carries no logical root sequence number, when the UE receives the first notification signaling and the second notification signaling, the UE determines the logical root sequence number carried in the second notification signaling as the first logical root sequence number.

Optionally, after the UE generates the random access preamble sequence based on the root sequence and the cyclic shift value, the UE obtains a first allocation quantity of contention-based random access preamble sequences; and the UE selects, from generated random access preamble sequences, the first allocation quantity of random access preamble sequences as the contention-based random access preamble sequences.

In a feasible solution, a specific manner in which the UE obtains the first allocation quantity of contention-based random access preamble sequences is: If the first notification signaling carries a quantity of contention-based random access preamble sequences, the quantity of contention-based random access preamble sequences that is carried in the first notification signaling is determined as the first allocation quantity. Optionally, because the second notification signaling carries a quantity of contention-based random access preamble sequences, the base station may configure the quantity of contention-based random access preamble sequences in each of the first notification signaling and the second notification signaling, so that random access preamble sequence resources can be flexibly allocated.

In another feasible solution, a specific manner in which the UE obtains the first allocation quantity of contention-based random access preamble sequences is: If the second notification signaling carries a quantity of contention-based random access preamble sequences, and the first notification signaling carries no quantity of contention-based random access preamble sequences, when the UE receives the first notification signaling and the second notification signaling, the UE determines the quantity of contention-based random access preamble sequences carried in the second notification signaling as the first allocation quantity.

Optionally, the first notification signaling is included in system information and/or mobile control information; and the second notification signaling may be included in the system information and/or mobile control information. For example, the base station may add the first notification signaling to to-be-sent system information and/or mobile control information, to send the first notification signaling.

According to a second aspect, an embodiment of the present invention provides user equipment, including:

a signaling receiving unit, configured to receive first notification signaling sent by a base station;

a cyclic shift value determining unit, configured to: when the first notification signaling is received, determine to calculate a cyclic shift value by using a first solution;

a sequence number obtaining unit, configured to obtain a first logical root sequence number;

a root sequence determining unit, configured to determine a root sequence based on the first logical root sequence number; and a sequence generation unit, configured to generate a random access preamble sequence based on the root sequence and the cyclic shift value, where the first solution is a solution of calculating the cyclic shift value when a Doppler shift of the UE is less than a first preset value and greater than a second preset value, the first preset value is less than or equal to twice of a physical random access channel PRACH subcarrier spacing, the second preset value is greater than or equal to 17 times of the PRACH subcarrier spacing, and the first preset value is greater than the second preset value.

In the second aspect of the embodiment of the present invention, when the first notification signaling is received, the cyclic shift value can be calculated by using a calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

With reference to the second aspect, in a first implementation of the second aspect, the first notification signaling carries a target Ncs index, and the cyclic shift value determining unit includes:

an Ncs value obtaining unit, configured to: when the first notification signaling sent by the base station is received, obtain, based on a preset mapping table between an Ncs index and an Ncs value, a target Ncs value corresponding to the target Ncs index; and a cyclic shift value calculation unit, configured to calculate, based on the target Ncs value, the cyclic shift value by using the first solution.

In this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes. Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

For example, if the quantity of Ncs indexes in the mapping table between an Ncs index and an Ncs value is 13, for example, if the Ncs indexes are integers 0 to 12, Ncs values corresponding to the Ncs indexes are respectively 15, 18, 22, 26, 32, 38, 46, 55, 68, 82, 100, 128, and 137.

With reference to the second aspect and the first implementation of the second aspect, in a second implementation of the second aspect, the first notification signaling further carries a high-speed flag bit, and the high-speed flag bit is used to indicate a solution of calculating the cyclic shift value; and the cyclic shift value determining unit is further configured to: when the first notification signaling sent by the base station is received, if the high-speed flag bit is a first preset identifier, determine to calculate the cyclic shift value by using the first solution.

Optionally, the cyclic shift value determining unit is further configured to:

when the first notification signaling sent by the base station is received, if the high-speed flag bit is a second preset identifier, determine to calculate the cyclic shift value by using a second solution; or when the first notification signaling sent by the base station is received, if the high-speed flag bit is a third preset identifier, determine to calculate the cyclic shift value by using a third solution, where the second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

With reference to the second aspect and the first implementation of the second aspect, in a third implementation of the second aspect, the signaling receiving unit is further configured to receive notification signaling sent by the base station, where the notification signaling includes the first notification signaling and/or second notification signaling, and the second notification signaling is used to instruct the UE to calculate the cyclic shift value by using a second solution or a third solution, where the second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

With reference to the third implementation of the second aspect, in a fourth implementation of the second aspect, the cyclic shift value determining unit is further configured to: when only the first notification signaling sent by the base station is received, determine to calculate the cyclic shift value by using the first solution; or the cyclic shift value determining unit is further configured to: when the first notification signaling and the second notification signaling that are sent by the base station are received, determine to calculate the cyclic shift value by using the first solution.

With reference to the third implementation of the second aspect, in a fifth implementation of the second aspect, if the UE does not receive the first notification signaling sent by the base station, but receives the second notification signaling sent by the base station, the UE determines to calculate the cyclic shift value by using the second solution or the third solution.

With reference to the third implementation of the second aspect, in a sixth implementation of the second aspect, the first notification signaling further carries a high-speed flag bit; and the cyclic shift value determining unit is further configured to: when the first notification signaling sent by the base station is received, if the high-speed flag bit is a first preset identifier, determine to calculate the cyclic shift value by using the first solution.

Optionally, the cyclic shift value determining unit is further configured to: when the first notification signaling and the second notification signaling that are sent by the base station are received, if the high-speed flag bit is a second preset identifier, determine, according to the second notification signaling, to calculate the cyclic shift value by using the second solution or the third solution.

With reference to the second aspect, the first implementation of the second aspect, the second implementation of the second aspect, the third implementation of the second aspect, the fourth implementation of the second aspect, the fifth implementation of the second aspect, or the sixth implementation of the second aspect, in a seventh implementation of the second aspect, if the first notification signaling carries a logical root sequence number, the sequence number obtaining unit is further configured to determine the logical root sequence number carried in the first notification signaling as the first logical root sequence number. In this case, the base station may configure different logical root sequence numbers in the first notification signaling and the second notification signaling, so that a probability that UE that performs access by using the first notification signaling collides with UE that performs access by using the second notification signaling can be reduced, a random access time can be shortened, and random access efficiency can be improved.

If the second notification signaling carries a logical root sequence number, and the first notification signaling carries no logical root sequence number, the sequence number obtaining unit is further configured to: when the first notification signaling and the second notification signaling are received, determine the logical root sequence number carried in the second notification signaling as the first logical root sequence number.

Optionally, the user equipment further includes a quantity obtaining unit and a sequence selection unit.

The quantity obtaining unit is configured to obtain a first allocation quantity of contention-based random access preamble sequences.

The sequence selection unit is configured to select, from generated random access preamble sequences, the first allocation quantity of random access preamble sequences as the contention-based random access preamble sequences.

In a feasible solution, if the first notification signaling carries a quantity of contention-based random access preamble sequences, the quantity obtaining unit is further configured to determine the quantity of contention-based random access preamble sequences carried in the first notification signaling as the first allocation quantity. Optionally, because the second notification signaling carries a quantity of contention-based random access preamble sequences, the base station may configure the quantity of contention-based random access preamble sequences in each of the first notification signaling and the second notification signaling, so that random access preamble sequence resources can be flexibly allocated.

In another feasible solution, if the second notification signaling carries a quantity of contention-based random access preamble sequences, and the first notification signaling carries no quantity of contention-based random access preamble sequences, the quantity obtaining unit is further configured to: when the first notification signaling and the second notification signaling are received, determine the quantity of contention-based random access preamble sequences carried in the second notification signaling as the first allocation quantity.

Optionally, the first notification signaling is included in system information and/or mobile control information; and the second notification signaling may be included in the system information and/or mobile control information. For example, the base station may add the first notification signaling to to-be-sent system information and/or mobile control information, to send the first notification signaling.

According to a third aspect, an embodiment of the present invention provides user equipment, where the user equipment includes a receiver and a processor;

the receiver is configured to receive first notification signaling sent by a base station;

the processor is configured to: when the first notification signaling is received, determine to calculate a cyclic shift value by using a first solution;

the processor is further configured to obtain a first logical root sequence number;

the processor is further configured to determine a root sequence based on the first logical root sequence number; and the processor is further configured to generate a random access preamble sequence based on the root sequence and the cyclic shift value, where the first solution is a solution of calculating the cyclic shift value when a Doppler shift of the UE is less than a first preset value and greater than a second preset value, the first preset value is less than or equal to twice of a physical random access channel PRACH subcarrier spacing, the second preset value is greater than or equal to the PRACH subcarrier spacing, and the first preset value is greater than the second preset value.

With reference to the third aspect, in a first implementation of the third aspect, the first notification signaling carries a target Ncs index; and the processor is further configured to: when the first notification signaling sent by the base station is received, obtain, based on a preset mapping table between an Ncs index and an Ncs value, a target Ncs value corresponding to the target Ncs index; and calculate, based on the target Ncs value, the cyclic shift value by using the first solution.

In this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes. Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

For example, if the quantity of Ncs indexes in the mapping table between an Ncs index and an Ncs value is 13, for example, if the Ncs indexes are integers 0 to 12, Ncs values corresponding to the Ncs indexes are respectively 15, 18, 22, 26, 32, 38, 46, 55, 68, 82, 100, 128, and 137.

With reference to the third aspect and the first implementation of the third aspect, in a second implementation of the third aspect, the first notification signaling further carries a high-speed flag bit, and the high-speed flag bit is used to indicate a solution of calculating the cyclic shift value; and the processor is further configured to: when the first notification signaling sent by the base station is received, if the high-speed flag bit is a first preset identifier, determine to calculate the cyclic shift value by using the first solution.

Optionally, the processor is further configured to:

when the first notification signaling sent by the base station is received, if the high-speed flag bit is a second preset identifier, determine to calculate the cyclic shift value by using a second solution; or when the first notification signaling sent by the base station is received, if the high-speed flag bit is a third preset identifier, determine to calculate the cyclic shift value by using a third solution, where the second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

With reference to the third aspect and the first implementation of the third aspect, in a third implementation of the third aspect, the receiver is further configured to receive notification signaling sent by the base station, where the notification signaling includes the first notification signaling and/or second notification signaling, and the second notification signaling is used to instruct the UE to calculate the cyclic shift value by using a second solution or a third solution, where the second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

With reference to the third implementation of the third aspect, in a fourth implementation of the third aspect, the processor is further configured to: when only the first notification signaling sent by the base station is received, determine to calculate the cyclic shift value by using the first solution; or the processor is further configured to: when the first notification signaling and the second notification signaling that are sent by the base station are received, determine to calculate the cyclic shift value by using the first solution.

With reference to the third implementation of the third aspect, in a fifth implementation of the third aspect, the processor is further configured to: if the first notification signaling sent by the base station is not received, but the second notification signaling sent by the base station is received, determine to calculate the cyclic shift value by using the second solution or the third solution.

With reference to the third implementation of the third aspect, in a sixth implementation of the third aspect, the first notification signaling further carries a high-speed flag bit; and the processor is further configured to: when the first notification signaling sent by the base station is received, if the high-speed flag bit is a first preset identifier, determine to calculate the cyclic shift value by using the first solution.

Optionally, the processor is further configured to: when the first notification signaling and the second notification signaling that are sent by the base station are received, if the high-speed flag bit is a second preset identifier, determine, according to the second notification signaling, to calculate the cyclic shift value by using the second solution or the third solution.

With reference to the third aspect, the first implementation of the third aspect, the second implementation of the third aspect, the third implementation of the third aspect, the fourth implementation of the third aspect, the fifth implementation of the third aspect, or the sixth implementation of the third aspect, in a seventh implementation of the third aspect, the processor is further configured to:

if the first notification signaling carries a logical root sequence number, determine the logical root sequence number carried in the first notification signaling as the first logical root sequence number; or if the second notification signaling carries a logical root sequence number, and the first notification signaling carries no logical root sequence number, when the first notification signaling and the second notification signaling are received, determine the logical root sequence number carried in the second notification signaling as the first logical root sequence number.

Optionally, the processor is further configured to obtain a first allocation quantity of contention-based random access preamble sequences; and the processor is further configured to select, from generated random access preamble sequences, the first allocation quantity of random access preamble sequences as the contention-based random access preamble sequences.

In a feasible solution, the processor is further configured to: if the first notification signaling carries a quantity of contention-based random access preamble sequences, determine the quantity of contention-based random access preamble sequences carried in the first notification signaling as the first allocation quantity. Optionally, because the second notification signaling carries a quantity of contention-based random access preamble sequences, the base station may configure the quantity of contention-based random access preamble sequences in each of the first notification signaling and the second notification signaling, so that random access preamble sequence resources can be flexibly allocated.

In another feasible solution, the processor is further configured to: if the second notification signaling carries a quantity of contention-based random access preamble sequences, and the first notification signaling carries no quantity of contention-based random access preamble sequences, when the UE receives the first notification signaling and the second notification signaling, determine the quantity of contention-based random access preamble sequences carried in the second notification signaling as the first allocation quantity.

Optionally, the first notification signaling is included in system information and/or mobile control information; and the second notification signaling may be included in the system information and/or mobile control information. For example, the base station may add the first notification signaling to to-be-sent system information and/or mobile control information, to send the first notification signaling.

According to a fourth aspect, an embodiment of the present invention provides a computer storage medium, configured to store a computer software instruction used by the foregoing user equipment, where the computer software instruction includes a program designed for executing the foregoing aspects.

In the embodiments of the present invention, names of the base station and the user equipment constitute no limitation on devices. In actual implementation, the devices may have other names. Provided that a function of each device is similar to that in the present invention, the device falls within the scope of the claims of the present invention and their equivalent technologies.

In the embodiments of the present invention, when the UE receives the first notification signaling sent by the base station, the UE determines to calculate the cyclic shift value by using the first solution; the UE obtains the first logical root sequence number, and determines the root sequence based on the first logical root sequence number; and the UE generates the random access preamble sequence based on the root sequence and the cyclic shift value. The first solution is a solution of calculating the cyclic shift value when the Doppler shift of the UE is less than the first preset value and greater than the second preset value. In this case, when the first notification signaling is received, the cyclic shift value can be calculated by using a $C_v$ calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
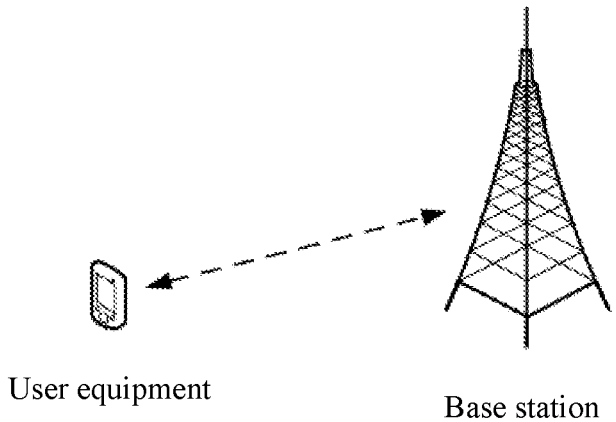
FIG. 1 is a diagram of a possible network architecture according to an embodiment of the present invention.

In a solution provided in the present invention, when a Doppler shift of UE is greater than a PRACH subcarrier spacing and less than twice of the PRACH subcarrier spacing, mutual interference between UEs can be eliminated, and a problem that fuzzy detection occurs when a base station detects random access sequences can be resolved.

To make persons skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and the like are intended to distinguish between different objects but do not indicate a particular order. In addition, the terms "include", "have", and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in the specification means that a particular characteristic, structure, or feature described with reference to the embodiment may be included in at least one embodiment of the present invention. The word occurring at various locations in the specification does not necessarily refer to a same embodiment, and is not an independent or optional embodiment exclusive of another embodiment. It is explicitly and implicitly understood by persons skilled in the art that the embodiments described in the specification may be combined with another embodiment.

To facilitate understanding of the present invention, the following first describes a diagram of a possible network architecture applicable to an embodiment of the present invention. A network architecture shown in FIG. 1 may include a base station and user equipment located in a coverage area of the base station. For example, in an LTE system, a random access process has two modes: contention-based random access and non-contention-based random access. A random access preamble sequence $x_{u,v}(n)$ defined in a standard 3GPP TS 36.211 is:

$$x_{u,v}(n) = x_u((n+C_v) \bmod N_{ZC}), \text{ where}$$

$x_u(n)$ is a Zadoff-Chu (ZC) sequence, "is a physical root sequence number, and a correspondence between" and each of a logical root sequence number and a preamble format is specified in 3GPP TS 36.211.

In specific implementation, the base station may send a logical root sequence number and a preamble format to UE, and the UE determines a physical root sequence number u based on the preset correspondence.

$N_{ZC}$ is a length of the ZC sequence, a correspondence between a preamble format and $N_{ZC}$ is specified in 3GPP TS 36.211. For preamble formats 1 to 3, $N_{ZC}=839$; and for a preamble format 4, $N_{ZC}=139$.

Further, $x_u(n)$ is:

$$x_u(n) = e^{-j\frac{\pi u n(n+1)}{N_{ZC}}},$$

$0 \le n \le N_{ZC}-1$.

$C_v$ is a cyclic shift value, and there are a plurality of $C_v$ calculation solutions.

For example, a first $C_v$ calculation solution is:

$$C_v = \begin{cases} vN_{cs} & v = 0, 1, \ldots \lfloor N_{zc}/N_{cs} \rfloor - 1, N_{cs} \ne 0 \\ 0 & N_{cs} = 0 \end{cases}.$$

A second $C_v$ calculation solution is:

$$C_v = d_{start} \lfloor v/n_{shift}^{RA} \rfloor + (v \bmod n_{shift}^{RA}), \text{ where}$$

$v=0, 1, \ldots, n_{shift}^{RA} n_{group}^{RA} + n_{shift}^{-RA} - 1$.

Further, $N_{cs}$ is a zero correlation zone length, and a correspondence between $N_{cs}$ and each of an $N_{cs}$ index and a preamble format is specified in 3GPP TS 36.211. In specific implementation, the base station may send an $N_{cs}$ index to the UE, and the UE determines $N_{cs}$ with reference to the sent preamble format.

Random access preamble sequences are specifically generated by receiving notification signaling that is sent by the base station and that is used to generate the random access preamble sequences. The notification signaling may carry a parameter such as a logical root sequence number, an Ncs index, or a quantity of contention-based random access preamble sequences. The random access preamble sequences are generated by using the parameter of the notification signaling and the foregoing random access preamble sequence generation solution. The first $C_v$ calculation solution is designed for a low-speed/static user, and the low-speed/static user uses random access preamble sequences finally obtained by using the first $C_v$ calculation solution. The second $C_v$ calculation solution is designed for a high-speed moving user, and similarly, the high-speed moving user uses random access preamble sequences finally obtained by using the second $C_v$ calculation solution, to eliminate mutual interference between UEs.

In actual application, the notification signaling carries a high-speed flag bit, so that UE that receives the notification signaling determines a $C_v$ calculation solution from the foregoing two $C_v$ calculation solutions. For example, after the UE receives the notification signaling, if the high-speed flag bit in the notification signaling is "true", the UE calculates the cyclic shift value by using the second $C_v$ calculation solution; or if the high-speed flag bit in the notification signaling is "false", the UE calculates the cyclic shift value by using the first $C_v$ calculation solution.

Further, $C_v$ calculation solutions are not limited to the foregoing two solutions. In a feasible solution, when a Doppler shift of the UE is greater than a PRACH subcarrier spacing and less than twice of the PRACH subcarrier spacing, calculation may be performed by using a $C_v$ calculation solution corresponding to this state. In this way, $C_v$ obtained through calculation can eliminate mutual interference between UEs, and resolve a problem that fuzzy detection occurs when the base station detects random access sequences. However, in an existing solution, only the first and the second $C_v$ calculation solutions can be used by using the notification signaling sent by the base station, and a $C_v$ calculation solution in another state cannot be used. For the high-speed user, if the random access preamble sequences are still generated by using the second $C_v$ calculation solution, mutual interference between UEs and the problem that fuzzy detection occurs when the base station detects random access sequences are caused.

In the embodiments of the present invention, when user equipment UE receives first notification signaling sent by a base station, the UE determines to calculate a cyclic shift value by using a first solution; the UE obtains a first logical root sequence number, and determines a root sequence based on the first logical root sequence number; and the UE generates random a access preamble sequence based on the root sequence and the cyclic shift value. The first solution is a solution of calculating the cyclic shift value when a Doppler shift of the UE is less than a first preset value and greater than a second preset value, the first preset value is less than twice of a physical random access channel PRACH subcarrier spacing, the second preset value is greater than the PRACH subcarrier spacing, and the first preset value is greater than the second preset value. In this case, by using the first notification signaling, the cyclic shift value can be calculated by using a $C_v$ calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

The embodiments of the present invention may be applied to another communications system in which random access preamble sequences need to be generated, for example, an evolved packet system (EPS), a Global System for Mobile communications (GSM), a Code Division Multiple Access (CDMA) system, a Wideband Code Division Multiple Access (WCDMA) system, a general packet radio service (GPRS), an LTE frequency division duplex (FDD) system, or LTE time division duplex (TDD).

In the embodiments of the present invention, the user equipment may include but is not limited to a terminal, a mobile station (MS), and the like. The user equipment may alternatively be a mobile phone (or referred to as a "cellular" phone), or a portable, pocket-sized, handheld, computer built-in, or in-vehicle mobile apparatus (a smart band, a smartwatch, smart glasses, or the like).

Based on the network architecture shown in FIG. 1, the base station and the user equipment in the embodiments of the present invention may have other names. Provided that a function of each device is similar to that in the present invention, the device falls within the scope of the claims of the present invention and their equivalent technologies.

Figure 2:
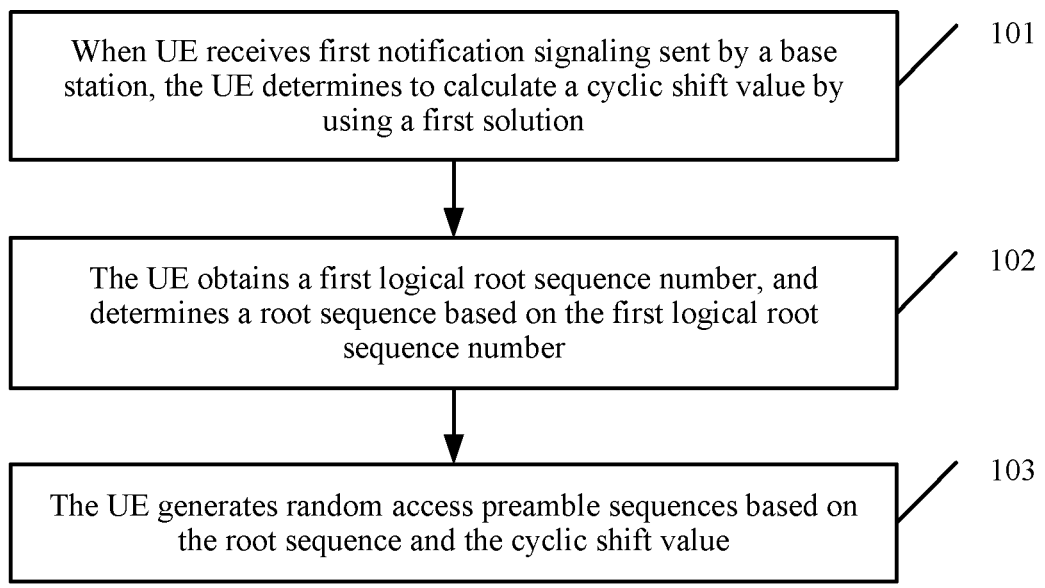
FIG. 2 is a schematic flowchart of a random access preamble sequence generation method according to an embodiment of the present invention.

Referring to FIG. 2, FIG. 2 is a schematic flowchart of a random access preamble sequence generation method according to an embodiment of the present invention. As shown in FIG. 2, the random access preamble sequence generation method in this embodiment of the present invention includes step 101 to step 103. The random access preamble sequence generation method in this embodiment of the present invention is performed by user equipment. For a specific process, refer to the following detailed description.

101. When the UE receives first notification signaling sent by a base station, the UE determines to calculate a cyclic shift value by using a first solution.

The first solution is a solution of calculating the cyclic shift value when a Doppler shift of the UE is less than a first preset value and greater than a second preset value, the first preset value is less than or equal to twice of a PRACH subcarrier spacing, the second preset value is greater than or equal to the PRACH subcarrier spacing, and the first preset value is greater than the second preset value.

The first notification signaling carries a target Ncs index. In this step, that the UE determines to calculate a cyclic shift value by using a first solution is specifically: The UE obtains, based on a preset mapping table between an Ncs index and an Ncs value, a target Ncs value corresponding to the target Ncs index; and the UE calculates, based on the target Ncs value, the cyclic shift value by using the first solution.

The mapping table between an Ncs index and an Ncs value is preset. In this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes.

Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

For example, the quantity of Ncs indexes in the mapping table between an Ncs index and an Ncs value is 13. For example, the Ncs indexes are integers 0 to 12. Referring to a mapping table between an Ncs index and an Ncs value shown in Table 1, the target Ncs value is 68 when the target Ncs index carried in the first notification signaling is 8.

TABLE 1

Mapping table between an Ncs index and an Ncs value

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 128 |
| 12 | 158 |

For example, referring to a mapping table between an Ncs index and an Ncs value shown in Table 2, the target Ncs value is 137 when the target Ncs index carried in the first notification signaling is 12.

TABLE 2

Mapping table between an Ncs index and an Ncs value

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 128 |
| 12 | 137 |

For example, referring to a mapping table between an Ncs index and an Ncs value shown in Table 3, the target Ncs value is 118 when the target Ncs index carried in the first notification signaling is 11.

TABLE 3

Mapping table between an Ncs index and an Ncs value

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137 |

Optionally, the preset mapping table between an Ncs index and Ncs may be modified. The modification herein may be adding a new Ncs index and an Ncs value corresponding to the new Ncs index; or the modification may be modifying an Ncs value corresponding to an existing Ncs index; or the modification may be deleting an existing Ncs index and an Ncs value corresponding to the Ncs index.

Optionally, when the modification is adding a new Ncs index and an Ncs value corresponding to the new Ncs index, the new Ncs index and the Ncs value corresponding to the new Ncs index may be added at any location in the mapping table. If the added Ncs value is greater than any existing Ncs value, an Ncs index corresponding to the added Ncs value is newly added. If the added Ncs value is less than one or more of existing Ncs values, the added Ncs value is inserted into the existing Ncs values in ascending order. In a feasible solution, Ncs indexes may be reallocated to all Ncs values obtained after insertion; or in another feasible solution, a new Ncs index may be allocated to the added Ncs value. This is not limited in this embodiment of the present invention.

Optionally, when the modification is deleting an existing Ncs index and an Ncs value corresponding to the Ncs index, any Ncs index in the mapping table and an Ncs value corresponding to the Ncs index may be deleted. In a feasible solution, after an existing Ncs index and an Ncs value corresponding to the Ncs index are deleted, Ncs indexes may be reallocated to Ncs values obtained after deletion; or in another feasible solution, original Ncs indexes are retained after deletion. This is not limited in this embodiment of the present invention.

For example, referring to a mapping table between an Ncs index and an Ncs value shown in Table 4, the mapping table between an Ncs index and an Ncs value shown in Table 4 shows a case in which a new Ncs index and an Ncs value corresponding to the new Ncs index have been added to the mapping table between an Ncs index and an Ncs value shown in Table 2. The new index may be inserted into existing Ncs indexes. If a preset Ncs value is less than or equal to 137, an Ncs value corresponding to the inserted new Ncs index is certainly less than 137. Therefore, the new Ncs index is inserted at any location, for example, a location following an Ncs index, 8, shown in Table 4, and the new Ncs index, X, and the Ncs value corresponding to the new Ncs index are stored in the mapping table between an Ncs index and an Ncs value.

TABLE 4

Mapping table between an Ncs index and an Ncs value

| Ncs index | Ncs |
|---|---|
| 0 | 15 |
| 1 | 18 |
| 2 | 22 |
| 3 | 26 |

TABLE 4-continued

Mapping table between an Ncs index and an Ncs value

| Ncs index | Ncs |
|---|---|
| 4 | 32 |
| 5 | 38 |
| 6 | 46 |
| 7 | 55 |
| 8 | 68 |
| X(9) | Insert another value |
| 10 | 82 |
| 11 | 100 |
| 12 | 128 |
| 13 | 137 |

For example, referring to a mapping table between an Ncs index and an Ncs value shown in Table 5, the mapping table between an Ncs index and an Ncs value shown in Table 5 shows a case in which a new Ncs index and an Ncs value corresponding to the new Ncs index have been added to the mapping table between an Ncs index and an Ncs value shown in Table 3. The new index may be inserted into existing Ncs indexes. If a preset Ncs value is less than or equal to 137, an Ncs value corresponding to the inserted new Ncs index is certainly less than 137. Therefore, the new Ncs index is inserted at any location, for example, a location following an Ncs index, 6, shown in Table 5, and the new Ncs index, X, and the Ncs value corresponding to the new Ncs index are stored in the mapping table between an Ncs index and an Ncs value.

TABLE 5

Mapping table between an Ncs index and an Ncs value

| Ncs index | Ncs |
|---|---|
| 0 | 15 |
| 1 | 18 |
| 2 | 22 |
| 3 | 26 |
| 4 | 32 |
| 5 | 38 |
| 6 | 46 |
| X(7) | Insert another value |
| 8 | 55 |
| 9 | 68 |
| 10 | 82 |
| 11 | 100 |
| 12 | 118 |
| 13 | 137 |

In a feasible solution, the first notification signaling is signaling that is agreed on by the base station with the UE and that is used for determining a solution of calculating the cyclic shift value. For example, the first notification signaling is used to instruct the UE to calculate the cyclic shift value by using the first solution. When the UE receives at least the first notification signaling, the UE determines to calculate the cyclic shift value by using the first solution.

In another feasible solution, the first notification signaling further carries a high-speed flag bit, and the high-speed flag bit is used to indicate a solution of calculating the cyclic shift value. In a feasible solution, when being different identifiers, the high-speed flag bit may indicate different solutions of calculating the cyclic shift value. For example, in this step, that the UE determines to calculate a cyclic shift value by using a first solution may be specifically: If the high-speed flag bit is a first preset identifier, the UE determines to calculate the cyclic shift value by using the first solution.

Besides this step, if the high-speed flag bit is a second preset identifier, the UE determines to calculate the cyclic shift value by using a second solution; or if the high-speed flag bit is a third preset identifier, the UE determines to calculate the cyclic shift value by using a third solution. The second solution is a solution of calculating the cyclic shift value when the Doppler shift of the UE is greater than a third preset value and less than the second preset value; the third solution is a solution of calculating the cyclic shift value when the Doppler shift of the UE is less than the third preset value; and the third preset value is less than the second preset value. Optionally, the third preset value is used to indicate a maximum frequency shift threshold obtained when a user is in a low-speed or static state.

Optionally, the first notification signaling may be included in system information and/or mobile control information. For example, the base station may add the first notification signaling to to-be-sent system information and/or mobile control information, to send the first notification signaling.

It should be noted that a case in which the Doppler shift of the UE is equal to the first preset value, a case in which the Doppler shift of the UE is equal to the second preset value, and a case in which the Doppler shift of the UE is equal to the third preset value may be added to corresponding conditions based on an actual situation. For example, the case in which the Doppler shift of the UE is equal to the first preset value may be added to a condition for performing the first solution, or may be added to a condition for performing the second solution. This is not limited in this embodiment of the present invention.

102. The UE obtains a first logical root sequence number, and determines a root sequence based on the first logical root sequence number.

The first notification signaling further carries a logical root sequence number. The UE directly determines the logical root sequence number carried in the first notification signaling as the first logical root sequence number.

Further, that the UE determines a root sequence based on the first logical root sequence number may be specifically: The UE searches a mapping table between a logical root sequence number and a physical root sequence number for a first physical root sequence number corresponding to the first logical root sequence number, and determines the root sequence by using the first physical root sequence number.

103. The UE generates a random access preamble sequence based on the root sequence and the cyclic shift value.

The random access preamble sequence is generated based on the cyclic shift value calculated by using the first solution and the root sequence determined based on the first logical root sequence number.

Optionally, the first notification signaling further carries a quantity of contention-based random access preamble sequences; after the UE generates the random access preamble sequences, the UE determines the quantity of contention-based random access preamble sequences carried in the first notification signaling as a first allocation quantity.

Optionally, after the UE receives the first notification signaling sent by the base station, there is no sequence between the step in which the UE determines to calculate a cyclic shift value by using a first solution and the step in which the UE obtains a first logical root sequence number, and determines a root sequence based on the first logical root sequence number.

For example, the base station may send first notification signaling to the UE. The first notification signaling carries a first logical root sequence number, a preamble format, and a target Ncs index. After the UE receives the first notification signaling, the UE determines a physical root sequence number u based on a preset correspondence, and further determines a root sequence $x_u(n)$, where $$x_u(n) = e^{-j\frac{\pi un(n+1)}{N_{ZC}}},$$

$0 \leq n \leq N_{ZC}-1$. For $N_{ZC}$, refer to related description in the embodiment shown in FIG. 1.

Then, the UE determines an Ncs value based on the target Ncs index, and calculates, based on the Ncs value, a cyclic shift value $C_v$ by using the first solution.

Finally, a random access preamble sequence $x_{u,v}(n)$ is generated based on the root sequence $x_u(n)$ and the cyclic shift value $C_v$, and $x_{u,v}(n)$ is $x_{u,v}(n)=x_u((n+C_v) \bmod N_{ZC})$.

In this embodiment of the present invention, when the UE receives the first notification signaling sent by the base station, the UE determines to calculate the cyclic shift value by using the first solution; the UE obtains the first logical root sequence number, and determines the root sequence based on the first logical root sequence number; and the UE generates the random access preamble sequence based on the root sequence and the cyclic shift value. The first solution is a solution of calculating the cyclic shift value when the Doppler shift of the UE is less than the first preset value and greater than the second preset value. In this case, when the first notification signaling is received, the cyclic shift value can be calculated by using a $C_v$ calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

Figure 3:
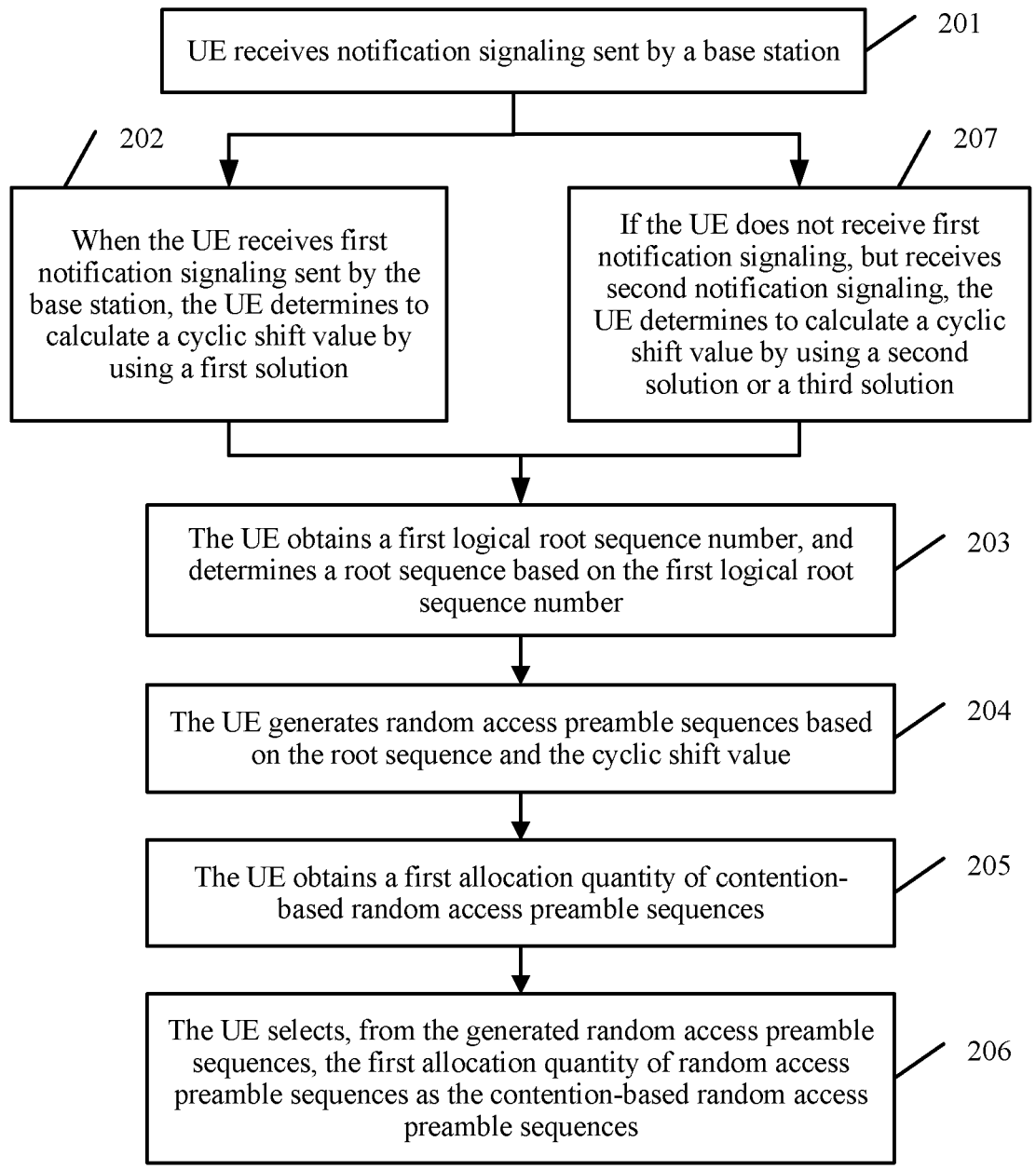
FIG. 3 is a schematic flowchart of another random access preamble sequence generation method according to an embodiment of the present invention.

Referring to FIG. 3, FIG. 3 is a schematic flowchart of a random access preamble sequence generation method according to an embodiment of the present invention. As shown in FIG. 3, the random access preamble sequence generation method in this embodiment of the present invention includes step 201 to step 207. The random access preamble sequence generation method in this embodiment of the present invention is performed by user equipment. For a specific process, refer to the following detailed description.

201. The UE receives notification signaling sent by a base station.

The notification signaling includes first notification signaling and/or second notification signaling, and the second notification signaling is used to instruct the UE to calculate a cyclic shift value by using a second solution or a third solution. The second solution is a solution of calculating the cyclic shift value when a Doppler shift of the UE is greater than a third preset value and less than a second preset value; the third solution is a solution of calculating the cyclic shift value when the Doppler shift of the UE is less than the third preset value; and the third preset value is less than the second preset value.

In a feasible solution, the second notification signaling carries a high-speed flag bit and an Ncs index. The UE calculates the cyclic shift value by using the second solution or the third solution. For example, if the high-speed flag bit is "true", the UE calculates, based on the Ncs index, the cyclic shift value by using the second solution; or if the high-speed flag bit is "false", the UE calculates, based on the Ncs index, the cyclic shift value by using the third solution.

Optionally, the first notification signaling may be included in system information and/or mobile control information, and the second notification signaling may be included in the system information and/or mobile control information. For example, the base station may add the first notification signaling to to-be-sent system information and/or mobile control information, to send the first notification signaling.

In a feasible solution, the UE may receive only the first notification signaling sent by the base station; or the UE receives only the second notification signaling sent by the base station; or the UE receives the first notification signaling and the second notification signaling that are sent by the base station.

202. When the UE receives first notification signaling sent by the base station, the UE determines to calculate a cyclic shift value by using a first solution.

The first solution is a solution of calculating the cyclic shift value when the Doppler shift of the UE is less than a first preset value and greater than the second preset value, the first preset value is less than or equal to twice of a physical random access channel PRACH subcarrier spacing, the second preset value is greater than or equal to the PRACH subcarrier spacing, and the first preset value is greater than the second preset value.

The first notification signaling carries a target Ncs index. In this step, that the UE determines to calculate a cyclic shift value by using a first solution is specifically: The UE obtains, based on a preset mapping table between an Ncs index and an Ncs value, a target Ncs value corresponding to the target Ncs index; and the UE calculates, based on the target Ncs value, the cyclic shift value by using the first solution.

The mapping table between an Ncs index and an Ncs value is preset. In this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes.

Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

Further, implementation solutions in which the UE determines whether to calculate the cyclic shift value by using the first solution may be separately described in the following two cases.

In a first feasible solution, the UE may determine, based on the received notification signaling, a solution of calculating the cyclic shift value. For example, the first notification signaling is used to instruct the UE to determine, after the UE receives at least the first notification signaling, to calculate the cyclic shift value by using the first solution, and the second notification signaling is used to instruct the UE to determine, after the UE receives only the second notification signaling, to calculate the cyclic shift value by using the second solution or the third solution.

Specifically, that when the user equipment UE receives first notification signaling sent by the base station, the UE determines to calculate a cyclic shift value by using a first solution may be specifically: When the UE receives only the first notification signaling sent by the base station, the UE determines to calculate the cyclic shift value by using the first solution; or when the UE receives the first notification signaling and the second notification signaling that are sent by the base station, the UE determines to calculate the cyclic shift value by using the first solution.

In a second feasible solution, the first notification signaling carries a high-speed flag bit. When the UE receives the first notification signaling, the UE determines the carried high-speed flag bit, to determine whether to calculate the cyclic shift value by using the first solution.

Specifically, that when the user equipment UE receives first notification signaling sent by the base station, the UE determines to calculate a cyclic shift value by using a first solution may be specifically: If the high-speed flag bit is a fourth preset identifier, the UE determines to calculate the cyclic shift value by using the first solution.

Optionally, if the high-speed flag bit carried in the first notification signaling is not a fourth preset identifier, the UE may alternatively perform the following operation: If the high-speed flag bit is a fifth preset identifier, when the UE receives the second notification signaling sent by the base station, the UE determines, according to the second notification signaling, to calculate the cyclic shift value by using the second solution or the third solution. After obtaining the cyclic shift value through calculation, the UE continues to perform steps 203 to 206, to generate random access preamble sequences.

Optionally, for the first feasible solution and the second feasible solution, step 207 may be further performed after step 201: If the UE does not receive first notification signaling sent by the base station, but receives second notification signaling sent by the base station, the UE determines to calculate a cyclic shift value by using a second solution or a third solution. After obtaining the cyclic shift value through calculation, the UE continues to perform steps 203 to 206, to generate random access preamble sequences.

It should be noted that a case in which the Doppler shift of the UE is equal to the first preset value, a case in which the Doppler shift of the UE is equal to the second preset value, and a case in which the Doppler shift of the UE is equal to the third preset value may be added to corresponding conditions based on an actual situation. For example, the case in which the Doppler shift of the UE is equal to the first preset value may be added to a condition for performing the first solution, or may be added to a condition for performing the second solution. This is not limited in this embodiment of the present invention.

203. The UE obtains a first logical root sequence number, and determines a root sequence based on the first logical root sequence number.

In a feasible solution, the first notification signaling carries a logical root sequence number, and the UE may determine the logical root sequence number carried in the first notification signaling as the first logical root sequence number. Optionally, because the second notification signaling carries a logical root sequence number, the base station may configure different logical root sequence numbers in the first notification signaling and the second notification signaling. This can reduce a probability that UE that performs access by using the first notification signaling collides with UE that performs access by using the second notification signaling, shorten a random access time, and improve random access efficiency.

In another feasible solution, the second notification signaling carries a logical root sequence number. Therefore, if the first notification signaling carries no logical root sequence number, when the UE receives the first notification signaling and the second notification signaling, the UE determines the logical root sequence number carried in the second notification signaling as the first logical root sequence number.

204. The UE generates a random access preamble sequence based on the root sequence and the cyclic shift value.

The random access preamble sequence is generated by using the cyclic shift value calculated in step 202 and the root sequence determined in step 203.

205. The UE obtains a first allocation quantity of contention-based random access preamble sequences.

In a feasible solution, the first notification signaling carries a quantity of contention-based random access preamble sequences, and the UE may determine the quantity of contention-based random access preamble sequences carried in the first notification signaling as the first allocation quantity. Optionally, because the second notification signaling carries a quantity of contention-based random access preamble sequences, the base station may configure the quantity of contention-based random access preamble sequences in each of the first notification signaling and the second notification signaling, so that random access preamble sequence resources can be flexibly allocated.

In another feasible solution, the second notification signaling carries a quantity of contention-based random access preamble sequences. Therefore, if the first notification signaling carries no quantity of contention-based random access preamble sequences, when the UE receives the first notification signaling and the second notification signaling, the UE determines the quantity of contention-based random access preamble sequences carried in the second notification signaling as the first allocation quantity.

206. The UE selects, from generated random access preamble sequences, the first allocation quantity of random access preamble sequences as the contention-based random access preamble sequences.

For example, a total quantity of generated random access preamble sequences is 64 in an LTE system. If the first allocation quantity is 32, 32 random access preamble sequences are selected from the generated random access preamble sequences as the contention-based random access preamble sequences. Optionally, remaining random access preamble sequences are used as non-contention-based random access preamble sequences.

In this embodiment of the present invention, when the UE receives the first notification signaling sent by the base station, the UE determines to calculate the cyclic shift value by using the first solution; the UE obtains the first logical root sequence number, and determines the root sequence based on the first logical root sequence number; and the UE generates a random access preamble sequence based on the root sequence and the cyclic shift value. The first solution is a solution of calculating the cyclic shift value when the Doppler shift of the UE is less than the first preset value and greater than the second preset value. In this case, when the first notification signaling is received, the cyclic shift value can be calculated by using a $C_v$ calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

The foregoing mainly describes the solutions in the embodiments of the present invention from a perspective of the user equipment. It may be understood that, to implement the foregoing functions, the user equipment includes corresponding hardware structures and/or software modules for performing the functions. Persons skilled in the art may easily be aware that, with reference to the units and algorithm steps in the examples described in the embodiments disclosed in this specification, the present invention can be implemented by using hardware or by using a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present invention.

In the embodiments of the present invention, the user equipment may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that unit division in the embodiments of the present invention is an example, and is merely logical function division. There may be another division manner in actual implementation.

Figure 4:
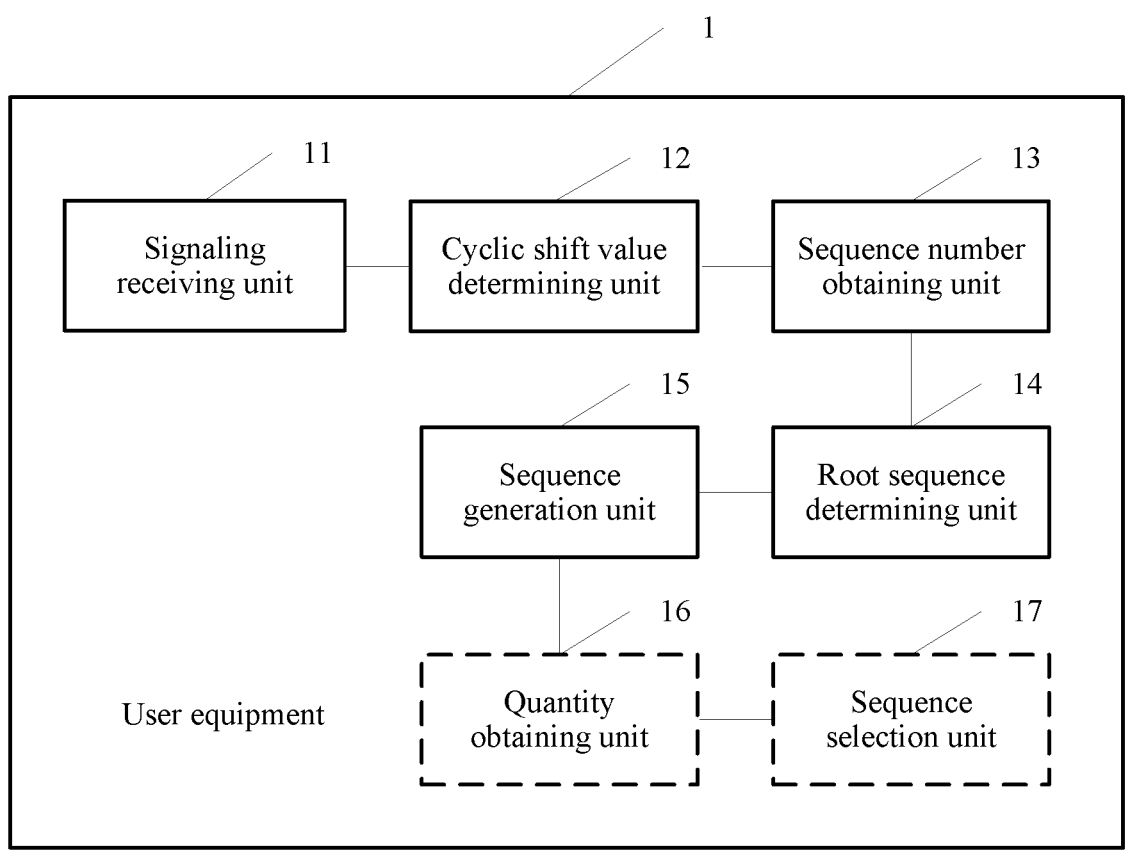
FIG. 4 is a schematic modular diagram of user equipment according to an embodiment of the present invention.

FIG. 4 is a schematic modular diagram of user equipment according to an embodiment of the present invention. The user equipment in this embodiment of the present invention may be the user equipment provided in any one of the embodiments in FIG. 2 and FIG. 3. As shown in FIG. 4, the user equipment 1 in this embodiment of the present invention may include a signaling receiving unit 11, a cyclic shift value determining unit 12, a sequence number obtaining unit 13, a root sequence determining unit 14, and a sequence generation unit 15. Optionally, the user equipment 1 may further include a quantity obtaining unit 16 and a sequence selection unit 17.

The signaling receiving unit 11 is configured to receive first notification signaling sent by a base station.

The cyclic shift value determining unit 12 is configured to: when the first notification signaling is received, determine to calculate a cyclic shift value by using a first solution.

The sequence number obtaining unit 13 is configured to obtain a first logical root sequence number.

The root sequence determining unit 14 is configured to determine a root sequence based on the first logical root sequence number.

The sequence generation unit 15 is configured to generate a random access preamble sequence based on the root sequence and the cyclic shift value.

The first solution is a solution of calculating the cyclic shift value when a Doppler shift of the UE is less than a first preset value and greater than a second preset value, the first preset value is less than or equal to twice of a physical random access channel PRACH subcarrier spacing, the second preset value is greater than or equal to 17 times of the PRACH subcarrier spacing, and the first preset value is greater than the second preset value.

Further, the first notification signaling carries a target Ncs index, and the cyclic shift value determining unit 12 includes an Ncs value obtaining unit and a cyclic shift value calculation unit.

The Ncs value obtaining unit is configured to: when the first notification signaling sent by the base station is received, obtain, based on a preset mapping table between an Ncs index and an Ncs value, a target Ncs value corresponding to the target Ncs index; and the cyclic shift value calculation unit is configured to calculate, based on the target Ncs value, the cyclic shift value by using the first solution.

Optionally, in this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes. Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

For example, if the quantity of Ncs indexes in the mapping table between an Ncs index and an Ncs value is 13, for example, if the Ncs indexes are integers 0 to 12, Ncs values corresponding to the Ncs indexes are respectively 15, 18, 22, 26, 32, 38, 46, 55, 68, 82, 100, 128, and 137.

In an optional solution, the first notification signaling further carries a high-speed flag bit, and the high-speed flag bit is used to indicate a solution of calculating the cyclic shift value; and the cyclic shift value determining unit 12 is further configured to: when the first notification signaling sent by the base station is received, if the high-speed flag bit is a first preset identifier, determine to calculate the cyclic shift value by using the first solution.

Optionally, the cyclic shift value determining unit 12 is further configured to:

when the first notification signaling sent by the base station is received, if the high-speed flag bit is a second preset identifier, determine to calculate the cyclic shift value by using a second solution; or when the first notification signaling sent by the base station is received, if the high-speed flag bit is a third preset identifier, determine to calculate the cyclic shift value by using a third solution.

The second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

Optionally, the signaling receiving unit 11 is further configured to receive notification signaling sent by the base station, where the notification signaling includes the first notification signaling and/or second notification signaling, and the second notification signaling is used to instruct the UE to calculate the cyclic shift value by using a second solution or a third solution.

The second solution is a solution of calculating the cyclic shift value when the Doppler shift of the UE is greater than a third preset value and less than the second preset value; the third solution is a solution of calculating the cyclic shift value when the Doppler shift of the UE is less than the third preset value; and the third preset value is less than the second preset value.

In another feasible solution, the cyclic shift value determining unit 12 is further configured to: when only the first notification signaling sent by the base station is received, determine to calculate the cyclic shift value by using the first solution; or the cyclic shift value determining unit 12 is further configured to: when the first notification signaling and the second notification signaling that are sent by the base station are received, determine to calculate the cyclic shift value by using the first solution.

Optionally, the cyclic shift value determining unit is further configured to: if the first notification signaling sent by the base station is not received, but the second notification signaling sent by the base station is received, determine to calculate the cyclic shift value by using the second solution or the third solution.

In another feasible solution, the first notification signaling further carries a high-speed flag bit; and the cyclic shift value determining unit 12 is further configured to: when the first notification signaling sent by the base station is received, if the high-speed flag bit is a first preset identifier, determine to calculate the cyclic shift value by using the first solution.

Optionally, the cyclic shift value determining unit 12 is further configured to: when the first notification signaling and the second notification signaling that are sent by the base station are received, if the high-speed flag bit is a second preset identifier, determine, according to the second notification signaling, to calculate the cyclic shift value by using the second solution or the third solution.

For the first logical root sequence number obtained by the sequence number obtaining unit 13, in a feasible solution, the first notification signaling carries a logical root sequence number, so that the base station can configure different logical root sequence numbers in the first notification signaling and the second notification signaling. This can reduce a probability that UE that performs access by using the first notification signaling collides with UE that performs access by using the second notification signaling, shorten a random access time, and improve random access efficiency.

The sequence number obtaining unit 13 is further configured to determine the logical root sequence number carried in the first notification signaling as the first logical root sequence number. In another feasible solution, the second notification signaling carries a logical root sequence number; and the sequence number obtaining unit 13 is further configured to: if the first notification signaling carries no logical root sequence number, when the first notification signaling and the second notification signaling are received, determine the logical root sequence number carried in the second notification signaling as the first logical root sequence number.

Optionally, the user equipment further includes the quantity obtaining unit 16 and the sequence selection unit 17.

The quantity obtaining unit 16 is configured to obtain a first allocation quantity of contention-based random access preamble sequences.

The sequence selection unit 17 is configured to select, from generated random access preamble sequences, the first allocation quantity of random access preamble sequences as the contention-based random access preamble sequences.

In a feasible solution, the first notification signaling carries a quantity of contention-based random access preamble sequences; and the quantity obtaining unit 16 is further configured to determine the quantity of contention-based random access preamble sequences carried in the first notification signaling as the first allocation quantity. Optionally, because the second notification signaling carries a quantity of contention-based random access preamble sequences, the base station may configure the quantity of contention-based random access preamble sequences in each of the first notification signaling and the second notification signaling, so that random access preamble sequence resources can be flexibly allocated.

In another feasible solution, the second notification signaling carries a quantity of contention-based random access preamble sequences; and the quantity obtaining unit 16 is further configured to: if the first notification signaling carries no quantity of contention-based random access preamble sequences, when the first notification signaling and the second notification signaling are received, determine the quantity of contention-based random access preamble sequences carried in the second notification signaling as the first allocation quantity.

Optionally, the first notification signaling is included in system information and/or mobile control information.

It should be noted that for specific implementations and technical effects of the functional units of the user equipment in the embodiment shown in FIG. 4, refer to specific description of the corresponding method embodiments in FIG. 2 and FIG. 3. Details are not described herein again.

In this embodiment of the present invention, when the UE receives the first notification signaling sent by the base station, the UE determines to calculate the cyclic shift value by using the first solution; the UE obtains the first logical root sequence number, and determines the root sequence based on the first logical root sequence number; and the UE generates the random access preamble sequence based on the root sequence and the cyclic shift value. The first solution is a solution of calculating the cyclic shift value when the Doppler shift of the UE is less than the first preset value and greater than the second preset value. In this case, when the first notification signaling is received, the cyclic shift value can be calculated by using a $C_v$ calculation solution specific for a state in which the Doppler shift of the UE is greater than the PRACH subcarrier spacing and less than twice of the PRACH subcarrier spacing, so that when the UE performs random access by using the random access preamble sequence generated based on the cyclic shift value and the root sequence, mutual interference between UEs is eliminated, and a problem that fuzzy detection occurs when the base station detects random access sequences is resolved.

Figure 5:
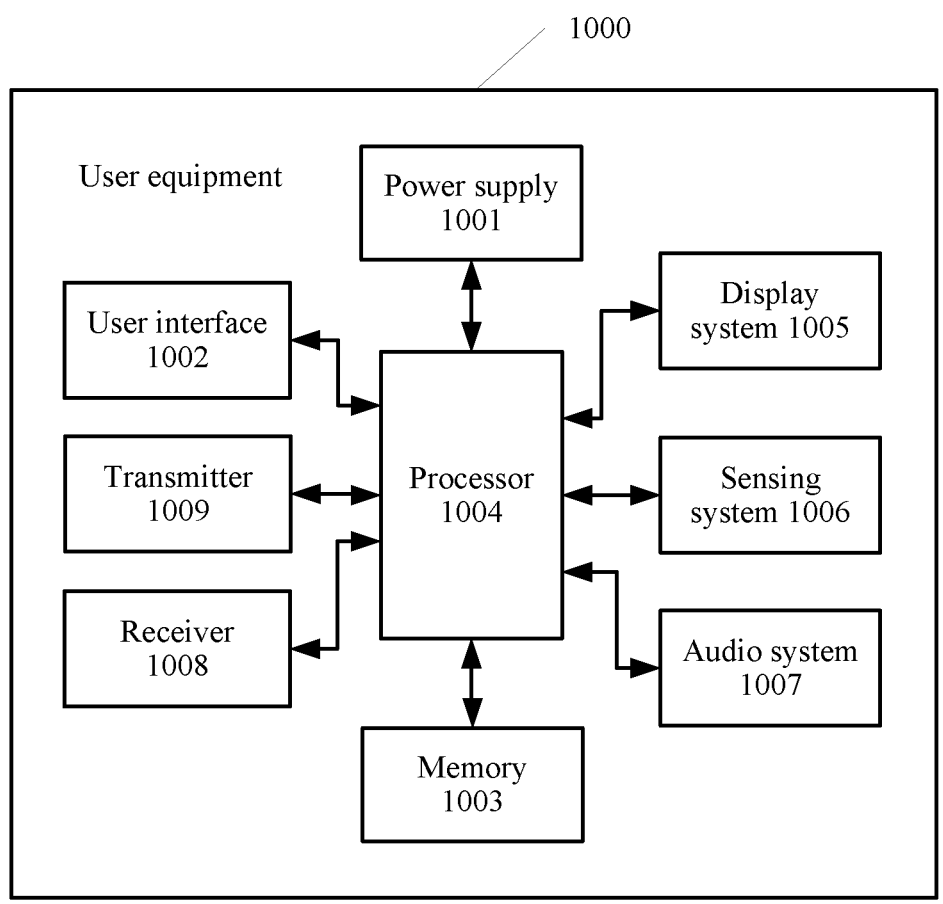
FIG. 5 is a schematic structural diagram of user equipment according to an embodiment of the present invention.

The user equipment in the embodiment shown in FIG. 4 may be implemented by using user equipment shown in FIG. 5. As shown in FIG. 5, FIG. 5 is a schematic structural diagram of user equipment according to an embodiment of the present invention. The user equipment 1000 shown in FIG. 5 includes a power supply 1001, a user interface 1002, a memory 1003, a processor 1004, a display system 1005, a sensing system 1006, an audio system 1007, a receiver 1008, and a transmitter 1009. A structure of the user equipment shown in FIG. 5 constitutes no limitation on this embodiment of the present invention.

The power supply 1001 ensures power for implementing various functions of the user equipment 1000. The user interface 1002 is configured to connect the user equipment 1000 and another device or apparatus, to implement communication or data transmission between the another device or apparatus and the user equipment 1000. The receiver 1008 and the transmitter 1009 are configured to implement communication or data transmission between the user equipment 1000 and devices such as a base station and a satellite, and are further configured to implement communication or data transmission between the user equipment 1000 and another user equipment. The processor 1004 may implement or execute various example logical blocks, modules, and circuits described with reference to content disclosed in the present invention. The display system 1005 is configured to output and display information and receive an operation entered by a user. The sensing system 1006 includes various sensors such as a temperature sensor and a distance sensor. The audio system 1007 is configured to output an audio signal. The memory 1003 is configured to store data of the user equipment 1000 or store application program code used to execute the solutions of the present invention, and the application program code is executed under control of the processor 1004. The processor 1004 is configured to execute the application program code stored in the memory 1003, to implement actions of the user equipment provided in any embodiment shown in FIG. 2 and FIG. 3.

The processor 1004 is applied to this embodiment of the present invention, and is configured to implement functions of the cyclic shift value determining unit 12, the sequence number obtaining unit 13, the root sequence determining unit 14, the sequence generation unit 15, the quantity obtaining unit 16, and the sequence selection unit 17 in FIG. 4. The receiver 1008 is applied to this embodiment of the present invention, and is configured to implement a function of the signaling receiving unit 11.

For example, the receiver 1008 is configured to receive first notification signaling sent by the base station.

The processor 1004 is configured to: when the first notification signaling is received, determine to calculate a cyclic shift value by using a first solution.

The processor 1004 is further configured to obtain a first logical root sequence number.

The processor 1004 is further configured to determine a root sequence based on the first logical root sequence number.

The processor 1004 is further configured to generate a random access preamble sequence based on the root sequence and the cyclic shift value.

The first solution is a solution of calculating the cyclic shift value when a Doppler shift of the UE is less than a first preset value and greater than a second preset value, the first preset value is less than or equal to twice of a physical random access channel PRACH subcarrier spacing, the second preset value is greater than or equal to the PRACH subcarrier spacing, and the first preset value is greater than the second preset value.

The first notification signaling carries a target Ncs index.

The processor 1004 is further configured to: when the first notification signaling sent by the base station is received, obtain, based on a preset mapping table between an Ncs index and an Ncs value, a target Ncs value corresponding to the target Ncs index; and calculate, based on the target Ncs value, the cyclic shift value by using the first solution.

In a possible embodiment, in this embodiment of the present invention, no limitation is imposed on a quantity of Ncs indexes and specific values of the Ncs indexes in the mapping table between an Ncs index and an Ncs value, and no limitation is imposed on the Ncs values corresponding to the Ncs indexes. Optionally, the Ncs value corresponding to the Ncs index in the mapping table between an Ncs index and an Ncs value is less than or equal to 137; or the Ncs value corresponding to the Ncs index in the mapping table between an Ncs index and an Ncs value is less than or equal to 158. Further, optionally, the quantity of Ncs indexes in the mapping table between an Ncs index and an Ncs value is less than or equal to 13.

For example, the quantity of Ncs indexes in the mapping table between an Ncs index and an Ncs value is 13, for example, if the Ncs indexes are integers 0 to 12, Ncs values corresponding to the Ncs indexes are respectively 15, 18, 22, 26, 32, 38, 46, 55, 68, 82, 100, 128, and 137.

In a possible embodiment, the first notification signaling further carries a high-speed flag bit, and the high-speed flag bit is used to indicate a solution of calculating the cyclic shift value.

The processor 1004 is further configured to: when the first notification signaling sent by the base station is received, if the high-speed flag bit is a first preset identifier, determine to calculate the cyclic shift value by using the first solution.

In a possible embodiment, the processor 1004 is further configured to:

when the first notification signaling sent by the base station is received, if the high-speed flag bit is a second preset identifier, determine to calculate the cyclic shift value by using a second solution; or when the first notification signaling sent by the base station is received, if the high-speed flag bit is a third preset identifier, determine to calculate the cyclic shift value by using a third solution.

The second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

In a possible embodiment, the receiver 1008 is further configured to receive notification signaling sent by the base station, where the notification signaling includes the first notification signaling and/or second notification signaling, and the second notification signaling is used to instruct the UE to calculate the cyclic shift value by using a second solution or a third solution.

The second solution is a solution of calculating the cyclic shift value when the Doppler shift of the UE is greater than a third preset value and less than the second preset value;

the third solution is a solution of calculating the cyclic shift value when the Doppler shift of the UE is less than the third preset value; and the third preset value is less than the second preset value.

In a possible embodiment, the processor 1004 is further configured to: when only the first notification signaling sent by the base station is received, determine to calculate the cyclic shift value by using the first solution; or the processor 1004 is further configured to: when the first notification signaling and the second notification signaling that are sent by the base station are received, determine to calculate the cyclic shift value by using the first solution.

In a possible embodiment, the processor 1004 is further configured to: if the first notification signaling sent by the base station is not received, but the second notification signaling sent by the base station is received, determine to calculate the cyclic shift value by using the second solution or the third solution.

In a possible embodiment, the first notification signaling further carries a high-speed flag bit; and the processor 1004 is further configured to: when the first notification signaling sent by the base station is received, if the high-speed flag bit is a first preset identifier, determine to calculate the cyclic shift value by using the first solution.

In a possible embodiment, the processor 1004 is further configured to: when the first notification signaling and the second notification signaling that are sent by the base station are received, if the high-speed flag bit is a second preset identifier, determine, according to the second notification signaling, to calculate the cyclic shift value by using the second solution or the third solution.

In a possible embodiment, the first notification signaling carries a logical root sequence number; and the processor 1004 is further configured to determine the logical root sequence number carried in the first notification signaling as the first logical root sequence number.

In a possible embodiment, the second notification signaling carries a logical root sequence number; and the processor 1004 is further configured to: if the first notification signaling carries no logical root sequence number, when the first notification signaling and the second notification signaling are received, determine the logical root sequence number carried in the second notification signaling as the first logical root sequence number.

In a possible embodiment, the processor 1004 is further configured to obtain a first allocation quantity of contention-based random access preamble sequences; and the processor 1004 is further configured to select, from the generated random access preamble sequences, the first allocation quantity of random access preamble sequences as the contention-based random access preamble sequences.

In a possible embodiment, the first notification signaling carries a quantity of contention-based random access preamble sequences; and the processor 1004 is further configured to determine the quantity of contention-based random access preamble sequences carried in the first notification signaling as the first allocation quantity.

In a possible embodiment, the second notification signaling carries a quantity of contention-based random access preamble sequences; and the processor 1004 is further configured to: if the first notification signaling carries no quantity of contention-based random access preamble sequences, when the first notification signaling and the second notification signaling are received, determine the quantity of contention-based random access preamble sequences carried in the second notification signaling as the first allocation quantity.

In a possible embodiment, the first notification signaling is included in system information and/or mobile control information.

In a possible embodiment, the receiver 1008 receives a resource configuration message sent by the base station. The resource configuration message is used to indicate a time-frequency resource for sending the random access preamble sequences. For contention-based random access, after generating the random access preamble sequences, the processor 1004 selects a random access preamble sequence from a contention-based random access preamble sequences. The transmitter 1009 sends the selected random access preamble sequence on the time-frequency resource indicated in the resource configuration message. For non-contention-based random access, the receiver 1008 receives a random access preamble sequence that is sent by the base station and that is used for non-contention-based random access, and the transmitter 1009 sends, on the time-frequency resource indicated in the resource configuration message, the random access preamble sequence used for non-contention-based random access.

An embodiment of the present invention further provides a computer storage medium, configured to store a computer software instruction used by the foregoing user equipment. The computer software instruction includes a program designed for the user equipment to execute the foregoing aspects, to implement actions of the user equipment in any embodiment shown in FIG. 2 and FIG. 3.

In the foregoing embodiments, the description of each embodiment has a respective focus. For a part that is not described in detail in an embodiment, refer to related descriptions in other embodiments.

It should be noted that, for brief description, the foregoing method embodiments are expressed as a combination of a series of actions. However, persons skilled in the art should appreciate that the present invention is not limited by the described action sequence, because according to the present invention, some steps may be performed in other sequences or performed simultaneously. In addition, persons skilled in the art should also appreciate that all the embodiments described in the specification are embodiments, and the related actions and modules are not necessarily mandatory to the present invention.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like, and may be specifically a processor in a computer device) to perform all or some steps of the foregoing methods described in the embodiments of the present invention. The foregoing storage medium may include any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A communications apparatus comprising:
    a receiver, configured to cooperate with a processor to receive signaling from a base station, wherein the signaling carries a target Ncs index for determining a Ncs value, wherein the Ncs value is for calculating a cyclic shift value; and
    the processor, configured to:
        obtain the Ncs value indicated by the target Ncs index, according to the target Ncs index and a preset correspondence between a set of Ncs indexes and a set of Ncs values, wherein the set of Ncs values comprises {15, 18, 22, 26, 32, 38, 46, 55, 68, 82, 100, 118, 137};
        calculate the cyclic shift value based on the Ncs value indicated by the target Ncs index;
        obtain a first logic root sequence number;
        obtain a root sequence based on the first logic root sequence number;
        generate a random access preamble sequence based on the root sequence and the cyclic shift value; and
        perform random access with the base station using the generated random access preamble sequence.

2. The communications apparatus according to claim 1, wherein the preset correspondence between the set of Ncs indexes and the set of Ncs values, comprising:

| Ncs Index | Ncs |
| --- | --- |
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137. |

3. The communications apparatus according to claim 1, further comprising:
    a memory, configured to store the preset correspondence between the set of Ncs indexes and the set of Ncs values.

4. The communications apparatus according to claim 1, wherein the receiver is further configured to cooperate with the processor to receive at least one of system information or mobile control information, wherein the at least one of the system information or the mobile control information comprises the signaling.

5. The communications apparatus according to claim 1, wherein the random access preamble sequence is defined as $X_{u,v}(n)$, wherein $X_{u,v}(n)=X_u((n+C_v) \bmod N_{zc})$, wherein $X_u(n)=e^{\wedge}((-j*\pi*n*(n+1))/N_{zc})$, $0 \le n < N_{zc}-1$, wherein $C_v$ is the cyclic shift value, wherein u is a physical root sequence number, wherein $X_u(n)$ is a Zadoff-Chu (ZC) sequence, and wherein $N_{zc}$ is a length of the ZC sequence.

6. The communications apparatus according to claim 1, wherein the signaling carries the first logic root sequence number.

7. The communications apparatus according to claim 1, wherein the processor is further configured to determine a solution for calculating the cyclic shift value according to the signaling received by the receiver.

8. The communications apparatus according to claim 1, wherein the communications apparatus is user equipment.

9. A random access method comprising:
    receiving signaling from a base station, wherein the signaling carries a target Ncs index for determining a Ncs value, wherein the Ncs value is for calculating a cyclic shift value;
    obtaining the Ncs value indicated by the target Ncs index, according to the target Ncs index and a preset correspondence between a set of Ncs indexes and a set of Ncs values, wherein the set of Ncs values comprises {15, 18, 22, 26, 32, 38, 46, 55, 68, 82, 100, 118, 137};
    calculating the cyclic shift value based on the Ncs value indicated by the target Ncs index:
    obtaining a first logic root sequence number;
    determining a root sequence based on the first logic root sequence number;
    generating a random access preamble sequence based on the root sequence and the cyclic shift value; and
    performing random access with the base station using the generated random access preamble sequence.

10. The method according to claim 9, wherein the preset correspondence between the set of Ncs indexes and the set of Ncs values, comprising:

| Ncs Index | Ncs |
| --- | --- |
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137. |

11. The method according to claim 9, further comprising:
    storing the preset correspondence between the set of Ncs indexes and the set of Ncs values.

12. The method according to claim 9, further comprising:
    receiving at least one of system information or mobile control information, wherein the at least one of the system information or the mobile control information comprises the signaling.

13. The method according to claim 9, wherein the random access preamble sequence is defined as $X_{u,v}(n)$, wherein $X_{u,v}(n)=X_u((n+C_v) \bmod N_{zc})$, wherein $X_u(n)=e^{\wedge}((-j*\pi*n*(n+1))/N_{zc})$, $0 \le n < N_{zc}-1$, wherein $C_v$ is the cyclic shift value, wherein u is a physical root sequence number, wherein $X_u(n)$ is a Zadoff-Chu (ZC) sequence, and wherein $N_{zc}$ is a length of the ZC sequence.

14. The method according to claim 9, wherein the signaling carries the first logic root sequence number.

15. The method according to claim 9, further comprising:
    determining a solution for calculating the cyclic shift value according to the signaling received by the receiver.

16. A non-transitory computer readable medium, comprising computer program instruction which when executed by one or more processors cause the one or more processors to execute operations including:
- receiving signaling from a base station, wherein the signaling carries a target Ncs index for determining a Ncs value, wherein the Ncs value is for calculating a cyclic shift value;
- obtaining the Ncs value indicated by the target Ncs index, according to the target Ncs index and a preset correspondence between a set of Ncs indexes and a set of Ncs values, wherein the set of Ncs values comprises 15, 18, 22, 26, 32, 38, 46, 55, 68, 82, 100, 118, 137};
- calculating the cyclic shift value based on the Ncs value indicated by the target Ncs index:
- obtaining a first logic root sequence number;
- determining a root sequence based on the first logic root sequence number;
- generating a random access preamble sequence based on the root sequence and the cyclic shift value; and
- performing random access with the base station using the generated random access preamble sequence.

17. The non-transitory computer readable medium according to claim 16, wherein the preset correspondence between the set of Ncs indexes and the set of Ncs values, comprising:

| Ncs Index | Ncs |
|---|---|
| 0 | 15 |
| 1 | 18 |
| 2 | 22 |
| 3 | 26 |
| 4 | 32 |
| 5 | 38 |
| 6 | 46 |
| 7 | 55 |
| 8 | 68 |
| 9 | 82 |
| 10 | 100 |
| 11 | 118 |
| 12 | 137. |

18. The communications apparatus according to claim 5, wherein $N_{zc}=839$ or $N_{zc}=139$.

19. The method according to claim 13, wherein $N_{zc}=839$ or $N_{zc}=139$.

* * * * *

UNITED STATES PATENT AND TRADEMARK OFFICE
CERTIFICATE OF CORRECTION

| | | |
|---|---|---|
| PATENT NO. | : 10,932,299 B2 | Page 1 of 1 |
| APPLICATION NO. | : 16/364556 | |
| DATED | : February 23, 2021 | |
| INVENTOR(S) | : Zhao et al. | |

It is certified that error appears in the above-identified patent and that said Letters Patent is hereby corrected as shown below:

On the Title Page

Page 2: Other Publications, Column 2, Line 17: "Qualcomm Incororated, "PRACH enhancements", 3GPP TSG RAN" should read -- Qualcomm Incorporated, "PRACH enhancements", 3GPP TSG RAN" --.

In the Claims

Claim 5: Column 31, Lines 60-61: "wherein $X_u(n) = e \wedge ((-j*\pi*n*(n+1))/N_{zc})$, $0 < n < N_{zc} - 1$, wherein $C_v$ is the" should read -- wherein $X_u(n) = e \wedge ((-j*\pi*u*n*(n+1))/N_{zc})$, $0 \leq n \leq N_{zc} - 1$, wherein $C_v$ is the --.

Claim 13: Column 32, Lines 56-57: "wherein $X_u(n) = e \wedge ((-j*\pi*n*(n+1))/N_{zc})$, $0 < n < N_{zc} - 1$, wherein $C_v$ is the cyclic shift value," should read -- wherein $X_u(n) = e \wedge ((-j*\pi*u*n*(n+1))/N_{zc})$, $0 \leq n \leq N_{zc} - 1$, wherein $C_v$ is the cyclic shift value, --.

Signed and Sealed this
Twenty-ninth Day of November, 2022

Katherine Kelly Vidal
*Director of the United States Patent and Trademark Office*